United States Patent
Abbott et al.

(10) Patent No.: US 12,350,707 B2
(45) Date of Patent: Jul. 8, 2025

(54) PURGEABLE INJECTION APPARATUS FOR SPILL-FREE REPLENISHMENT OF EMBEDDED FOUNDATION PRESERVATION WRAPS

(71) Applicant: COPPER CARE WOOD PRESERVATIVES, INC., Humphrey, NE (US)

(72) Inventors: William Abbott, Humphrey, NE (US); Michael Powell, Humphrey, NE (US)

(73) Assignee: COPPER CARE WOOD PRESERVATIVES, INC., Humphrey, NE (US)

( * ) Notice: Subject to any disclaimer, the term of this patent is extended or adjusted under 35 U.S.C. 154(b) by 0 days.

(21) Appl. No.: 18/259,373

(22) PCT Filed: Mar. 22, 2023

(86) PCT No.: PCT/AU2023/050205
§ 371 (c)(1),
(2) Date: Jun. 26, 2023

(87) PCT Pub. No.: WO2023/178382
PCT Pub. Date: Sep. 28, 2023

(65) Prior Publication Data
US 2024/0383002 A1    Nov. 21, 2024

(30) Foreign Application Priority Data
Mar. 22, 2022    (AU) ................................ 2022900711

(51) Int. Cl.
*B05D 1/26*    (2006.01)
*B05C 5/02*    (2006.01)
(Continued)

(52) U.S. Cl.
CPC .............. *B05D 1/26* (2013.01); *B05C 5/0241* (2013.01); *B05C 5/0291* (2013.01);
(Continued)

(58) Field of Classification Search
CPC . B27K 3/105; B27K 3/14; B27K 3/02; B27K 3/0235; E02D 5/226; E02D 31/00;
(Continued)

(56) References Cited

U.S. PATENT DOCUMENTS

| 3,595,182 | A | 7/1971 | Clapp |
| 3,834,329 | A | 9/1974 | Inkis et al. |

(Continued)

FOREIGN PATENT DOCUMENTS

| GB | 937744 A | 9/1963 |
| WO | 2019183666 A1 | 10/2019 |

OTHER PUBLICATIONS

International Search Report & Written Opinion dated Jun. 12, 2023 from PCT Application No. PCT/AU2023/050205.

*Primary Examiner* — Andrew J Triggs
(74) *Attorney, Agent, or Firm* — INNOVATION CAPITAL LAW GROUP, LLP; Vic Lin

(57) ABSTRACT

The present injection apparatus is designed for replenishing embedded foundation preservation wraps with preservative whilst avoiding spillage. The injection apparatus comprises an injection bayonet having a lumen fluidly interfacing a plurality of preservative outlet nozzles along the injection bayonet and a preservative inlet fluidly interfacing the lumen. A portable preservative containing tank may be attached to the inlet via a flexible hose. The apparatus further comprises a syringe operating between the preservative inlet and the lumen. When replenishing the preservation wrap, the injection bayonet is inserted between the preservation wrap and the foundation so that preservative is configured to be
(Continued)

supplied via the preservative inlet to flow out from the nozzles via the lumen to replenish the preservation wrap with the preservative. After replenishment, the lumen is purged of residual preservative using the syringe.

25 Claims, 3 Drawing Sheets

(51) Int. Cl.
    *B05C 11/10*     (2006.01)
    *B05D 7/06*     (2006.01)
    *B27K 3/02*     (2006.01)
    *B27K 3/14*     (2006.01)
    *B27K 3/22*     (2006.01)
    *F16K 23/00*     (2006.01)

(52) U.S. Cl.
    CPC ............ *B05C 11/1039* (2013.01); *B05D 7/06* (2013.01); *B27K 3/02* (2013.01); *B27K 3/0235* (2013.01); *B27K 3/14* (2013.01); *B27K 3/22* (2013.01); *F16K 23/00* (2013.01)

(58) Field of Classification Search
    CPC .......... B05D 1/26; B05D 7/06; B05C 5/0241; B05C 11/1039; F16K 23/00
    USPC ............................. 52/169.14, 741.3; 405/211
    See application file for complete search history.

(56) References Cited

U.S. PATENT DOCUMENTS

| | | | |
|---|---|---|---|
| 5,829,920 A * | 11/1998 | Christenson | E02D 5/64 |
| | | | 405/211 |
| 2014/0150337 A1 | 6/2014 | Montecchio et al. | |
| 2024/0383002 A1* | 11/2024 | Abbott | E02D 31/06 |

* cited by examiner

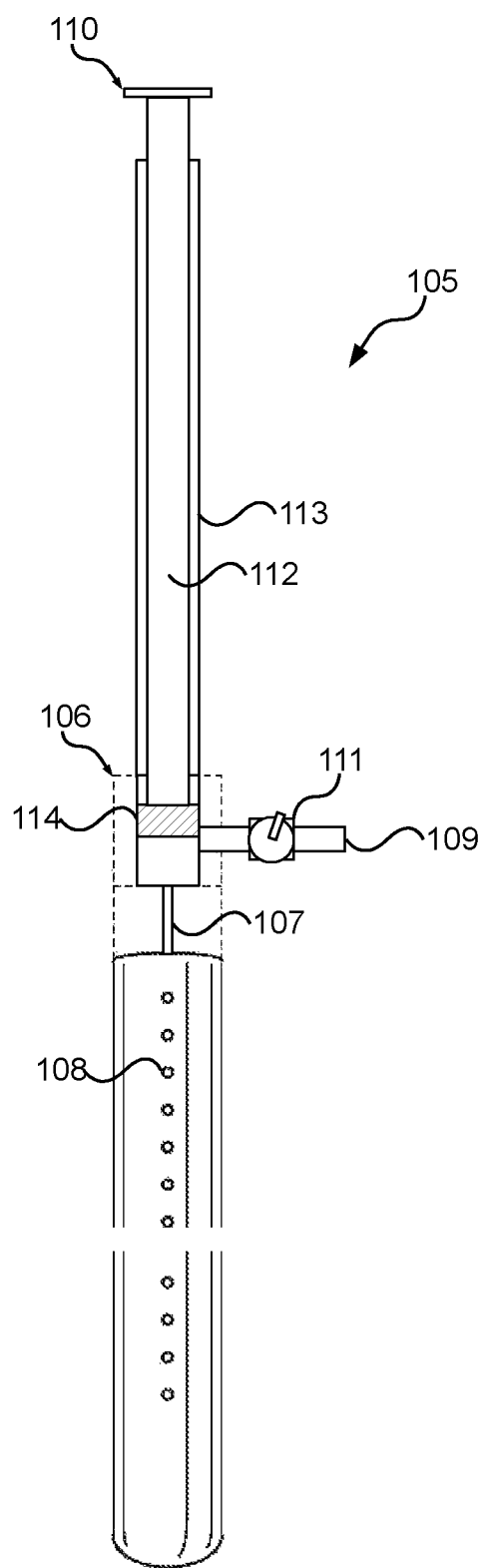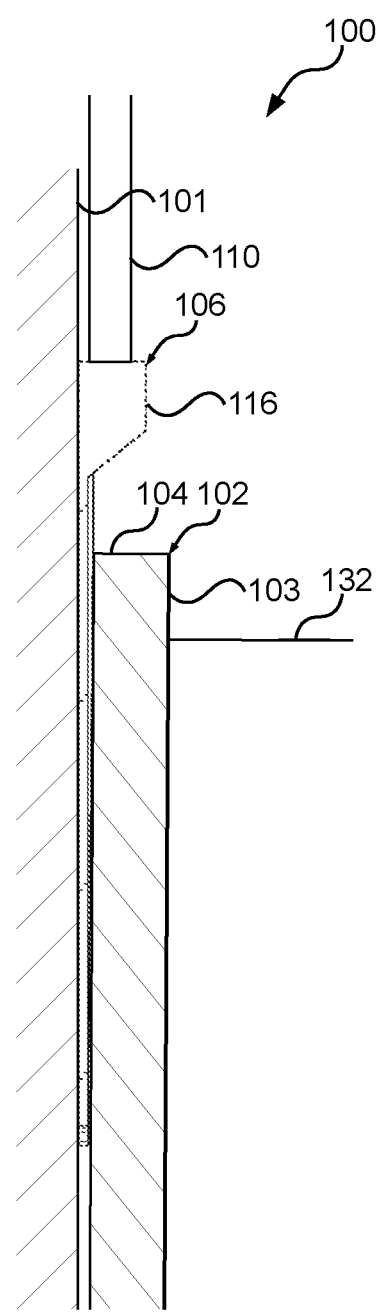
Figure 1
Figure 2

PURGEABLE INJECTION APPARATUS FOR SPILL-FREE REPLENISHMENT OF EMBEDDED FOUNDATION PRESERVATION WRAPS

FIELD OF THE INVENTION

This invention relates to injection apparatus for replenishing embedded foundation preservation wraps with preservative which is purgeable to avoid spillage.

BACKGROUND OF THE INVENTION

Chemical preservatives are used for preservation of embedded foundations, such as of wooden telegraph poles and the like.

For example, GB 937744 A (BURT BOULTON AND HAYWOOD LTD; WILLIAM EDWARD FINCH) 25 Sep. 1963 discloses a method of wood preservation of utility poles using a liquid creosote wood preservative composition and bandage material wrapped thereabout. The bandage material has an inner absorbent pad such as of cotton and an exterior protective liner such as of polyethylene (PE) or polyvinyl chloride (PVC).

Chemical preservatives may be toxic and therefore safe handling thereof is desirous. It is especially desirous for a chemical applicator system for application of chemical preservatives for embedded foundation protection without spillage which may come into contact with the user.

SUMMARY OF THE DISCLOSURE

There is provided herein injection apparatus for replenishing embedded foundation preservation wraps with preservative which is purgeable to avoid any spillage.

The injection apparatus comprises an injection bayonet having a lumen fluidly interfacing a plurality of preservative outlet nozzles along the injection bayonet and a preservative inlet fluidly interfacing the lumen. A portable preservative containing tank may be attached to the inlet via a flexible hose.

The apparatus further comprises a syringe operating between the preservative inlet and the lumen.

When replenishing the preservation wrap, the injection bayonet is inserted between the preservation wrap and the foundation so that preservative is supplied via the preservative inlet to flow out from the nozzles via the lumen to replenish the preservation wrap with the preservative.

After replenishment, the lumen is purged of residual preservative using the syringe.

As such, residual preservative is purged from the lumen of the injection bayonet, thereby reducing or eliminating dripping or spillage which could otherwise come into contact with the operator.

According to a first embodiment shown in FIG. 1, a plunger piston of the syringe does not reciprocate within the lumen and the apparatus may comprise a shut-off valve operating between the syringe and the preservative inlet.

According to this first embodiment, after the replenishment, the lumen is purged by depressing a plunger of the syringe to purge residual preservative from the lumen of the injection bayonet. In embodiments, the plunger may be retracted again to suck any preservative yet remaining within the lumen away from the nozzles.

According to a second embodiment shown in FIG. 6, the plunger piston reciprocates within the lumen. As such, when replenishing the preservation wrap, the plunger piston is positioned away from between the preservative inlet and the lumen so that preservative can flow from the preservative inlet into the lumen. Furthermore, after the replenishment, the plunger is depressed to purge any remaining preservative from the lumen via the nozzles. Similarly, after depressing the plunger, the plunger may again be retracted to suck any further remaining preservative within the lumen away from the nozzles.

In embodiments, the piston plunger may be positionable at the preservative inlet to block fluid flow passage between the preservative inlet and the lumen.

The piston plunger is preferably retained in this position during transportation and the like to prevent preservative leaking between the inlet and the lumen of the injection bayonet. This piston plunger position may also serve as a failsafe mechanism in case the shut-off valve of the first embodiment accidentally opens.

According to the first embodiment shown in FIG. 1, the injection bayonet may be bendable and made of plastic. Furthermore, in accordance with this embodiment, the injection bayonet may be disconnected from the syringe.

According to the second embodiments shown in FIG. 6, the apparatus may be made of metallic componentry.

Other aspects of the invention are also disclosed.

BRIEF DESCRIPTION OF THE DRAWINGS

Notwithstanding any other forms which may fall within the scope of the present invention, preferred embodiments of the disclosure will now be described, by way of example only, with reference to the accompanying drawings in which:

FIG. 1 shows injection apparatus for preservative replenishment of embedded foundation preservation wraps in accordance with an embodiment;

FIG. 2 shows a side view illustrating the insertion of a nozzled injection bayonet of the apparatus between an embedded foundation and their preservation wrap subsumed thereabout;

DESCRIPTION OF EMBODIMENTS

Figure 3:
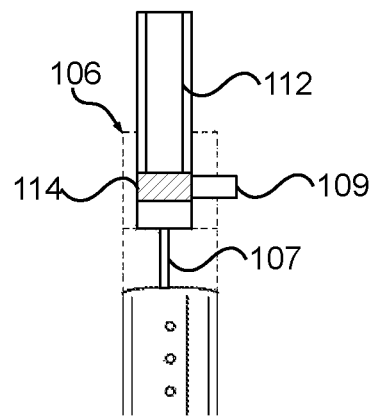
FIG. 3 illustrates the apparatus in a closed position.

FIG. 2 shows a system 100 comprising an embedded foundation 101 and a preservation wrap 102 surrounding the embedded foundation 101.

The embedded foundation 101 may be that of a wooden utility pole, metallic pier or the like and the preservation wrap 102 may be impregnated with preservative to preserve the embedded foundation 101.

The preservation wrap 102 may comprise an inner absorbent mat 104 which is impregnated with the preservative and which lies against the exterior surface of the foundation 101. The mat 104 may be protected by an exterior impregnable sheet 103, such as of plastic. The mat 104 preferably comprises nonwoven polypropylene fibres. Hydrophobic properties of the polypropylene fibres make the polypropylene mat 104 uniquely suited for embedding in soil below groundline 132.

The preservative may comprise a bactericide, fungicide or the like. The preservative may comprise wood preservative such as copper naphthenate or a corrosion inhibitor such as zinc naphthenate. The preservative may be an oil-based preservative.

Figure 6:
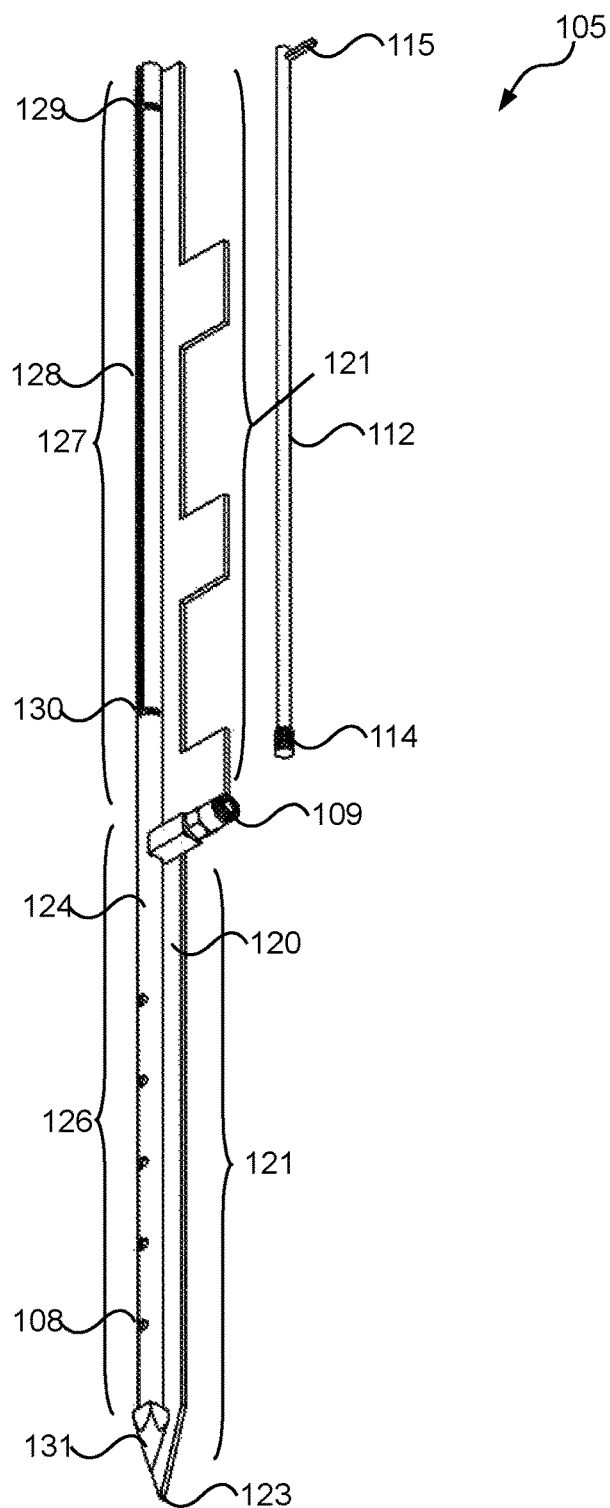
FIG. 6 shows a disassembled perspective view of the injection apparatus in accordance with a further embodiment.

The system 100 further comprises injection apparatus 105 as is shown in FIG. 1 in accordance with a first embodiment or as is shown in FIG. 6 in accordance with a second embodiment.

The injection apparatus 105 comprises a relatively thin injection bayonet 106. As is shown in FIG. 2, the injection bayonet 106 is designed to insert between the preservation wrap 102 and the foundation 101.

The injection bayonet 106 has an interior delivery lumen 107 fluidly interfacing a plurality of preservative outlet nozzles 108 along the injection bayonet 106.

The injection apparatus 105 further comprises a preservative inlet 109 fluidly interfacing the lumen 107. A flexible hose may connect the preservative inlet 109 to a portable tank of preservative. Preservative may flow from the tank by gravity feed or, alternatively, the tank may be pressurised or comprise an electric pump.

The injection apparatus 105 further comprises a syringe 110 operating between the preservative inlet 109 and the lumen 107. The syringe 110 may have a plunger 112 having plunger piston 114.

According to the embodiment shown in FIG. 1, the plunger piston 114 reciprocates within a barrel 114 away from the injection bayonet 106. Alternatively, according to the embodiment of FIG. 6, the plunger piston 114 reciprocates within the lumen 107.

The apparatus 105 may comprises a shut-off valve 111 operating between the syringe 110 and the preservative inlet 109.

As shown in FIG. 2, the injection bayonet 106 is configured to be inserted between the preservation wrap 102 and the embedded foundation 101. When the injection bayonet 106 is inserted, preservative may be supplied to the inlet 109 so that the preservative can flow out from the nozzles 108 via the lumen 107 to replenish the mat 104 of the preservation wrap 102 with the preservative.

According to the first embodiment of FIG. 1, after replenishment, the injection bayonet 106 may be purged of preservative by closing the shut-off valve 111 and depressing the plunger 112 so that the piston 114 purges excess preservative from the lumen 107 of the injection bayonet 106. In embodiments, the plunger 112 may again be retracted to suck in a yet residual preservative within the lumen 107 away from the nozzles 108.

Figure 4:
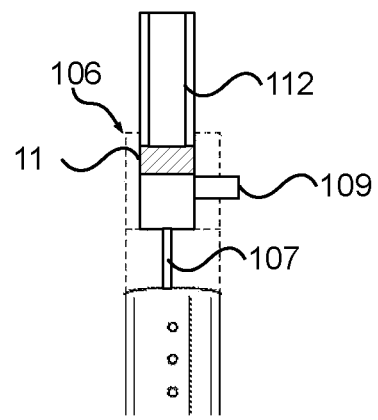
FIG. 4 illustrates the apparatus in an open position.

According to the second embodiment of FIG. 6, during replenishment, the plunger 112 may be retracted so that the piston 114 is positioned away from between the inlet 109 and the lumen 107 as is illustrated in FIG. 4 so that the preservative can flow freely from the inlet 109 and out from the nozzles 108. After the replenishment, the plunger 112 may be depressed to purge remaining preservative from the lumen 107 via the nozzles 108. The plunger 112 may again be retracted to suck any further remaining preservative within the lumen 107 away from the nozzles 108, if required.

As such, according to either embodiment of FIG. 1 or FIG. 6, the lumen 107 of the injection bayonet 106 is purged of excess preservative thereby avoiding dripping or leaking of preservative after replenishing the preservation wrap 102 which may come into contact with the user.

FIG. 4 shows wherein the plunger piston 114 is positioned away from between the preservative inlet 109 and the lumen 107 so that the preservative can freely flow from the preservative inlet 109 into the lumen 107.

FIG. 3 shows wherein the plunger piston 114 is positionable at the preservative inlet 109 to block the preservative inlet 109 so that the preservative cannot flow between the preservative inlet 109 and the lumen 107. In this position, the plunger piston 114 provides a failsafe mechanism to prevent preservative flow between the inlet 109 and the lumen 107, including in case the shut-off valve 111 accidentally opens. The plunger piston 114 may be placed in this position when transporting the apparatus 105.

In embodiments, the shut-off valve 111 is a manual shut-off valve such as wherein the shut-off valve 111 is barrel shut-off valve which is configured to be manually opened or closed by the user. Alternatively, the shut-off valve 111 may be an automatic shut-off valve which automatically opens under positive pressure at the preservative inlet 109.

The syringe 110 is preferably a substantially aligned with a longitudinal axis of the injection bayonet 106 so that the apparatus 105 is configured to be inserted upright and closely against the foundation 101 as is shown in FIG. 2.

The nozzles 108 are preferably arranged only on an exterior surface of the injection bayonet 106 so that the preservative flows directly into the mat 104 of the preservation wrap 102.

An exterior surface of the injection bayonet 106 may be generally convex in longitudinal cross-section. Furthermore, a rear surface of the injection bayonet 106 may be planar to lie flat against the foundation 101.

Figure 5:
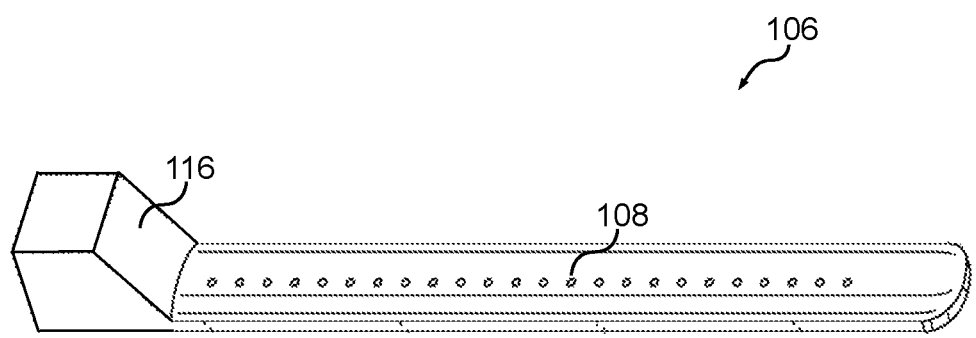
FIG. 5 shows a perspective view of an injection bayonet of the apparatus in accordance with an embodiment.

According to the embodiments shown in FIGS. 1, 2 and 5, the injection bayonet 106 is bendable and made of plastic. In accordance with this embodiment, the injection bayonet 106 may be made from an injection moulding, 3D printing or similar process.

In accordance with this embodiment, the injection bayonet 106 may be disconnected from the syringe 110. Specifically, the injection bayonet 106 may comprises a syringe connection hub 116. The syringe connection hub 116 may comprise a threaded bore within which a corresponding threaded end of the syringe 110 is turned to connect the syringe 110 and the injection bayonet 106.

The planar rear surface of the injection bayonet 106 may continually extend behind the connection hub 116.

FIG. 6 shows an alternative embodiment wherein the apparatus 105 may be made of metallic componentry, such as brass or other metal compatible with the type of preservative used.

In accordance with this embodiment, the apparatus 105 may comprise a profiled backing plate 120 integrally forming a distal bayonet backing portion 121 and a proximal syringe backing portion 122.

The distal bayonet backing portion 121 may be relatively narrow and may be sharpened to a point 123.

The proximal syringe backing portion 122 may comprise a series of tabs 125 which may provide purchase to insert or remove the apparatus 105.

The apparatus 105 may further comprise a semicylindrical tube portion 124 attached to the backing plate 120. The semicylindrical tube portion 124 and the backing plate 120 define the lumen 107 therebetween. Furthermore, the plunger piston 114 may reciprocate within the lumen 107 according to this embodiment.

The semicylindrical tube portion 124 may define a distal bayonet fronting portion 126 having the series of nozzles 108 therethrough. A half cone tip 131 may interface a distal end of the semicylindrical tube portion 124.

The semicylindrical tube portion 124 may further define a proximal syringe fronting portion 127.

The proximal syringe fronting portion 127 may define a longitudinal channel 128 along the length of the proximal syringe fronting portion 127. A handle 115 may extend from one side of the plunger 112 so as to be able to travel along the length of the longitudinal channel 128.

The proximal syringe fronting portion 127 may further comprise a proximal locking slot 129 and a distal locking slot 130. The plunger 112 may be rotated to engage the handle 115 within the proximal locking slot 129 to hold the plunger 112 fully retracted or within the distal locking slot 129 to hold the plunger 112 fully inserted.

A further locking slot (not shown) may be provided to position the plunger piston 114 at the preservative inlet 109 as shown in FIG. 3 to block the inlet 109.

Utilisation of the injection apparatus 105 according to the first embodiment shown in FIGS. 1, 2 and 5 to replenish an embedded foundation 101 preservation wrap 102 may comprise keeping the plunger piston 114 in the closed position shown in FIG. 3 so that preservative cannot leak between the inlet 109 and the lumen 107 during transportation and the like. Where the shut-off valve 111 is a manual shut-off valve, the manual shut-off valve 111 may be kept closed.

During replenishment, the injection bayonet 106 in inserted between the foundation 101 and the preservation wrap 102 in the manner shown in FIG. 2.

The plunger piston 114 is positioned in the open position shown in FIG. 4 so that preservative can flow or be pumped via the preservative inlet 109 to seep via the nozzles 108 to impregnate the mat 104 of the preservation wrap 102.

Once a sufficient volume of preservative has been injected, the shut-off valve 111 may be closed (or close automatically under lack of positive pressure via the preservative inlet 109 or negative pressure caused by the syringe 110 as alluded to above) whereafter the plunger 112 is depressed so that any residual preservative is purged from the lumen 107 of the injection bayonet 106 so that little or no preservative remains to drips from the injection bayonet 106. In embodiments, the plunger 112 may again be retracted to suck in yet residual preservative from the lumen 107 away from the nozzles 108.

Using the injection apparatus 105 according to the second embodiment shown in FIG. 7 to replenish the preservation wrap 102 may comprise positioning the plunger piston 114 above the preservative inlet 109 as is illustrated in FIG. 4 so that preservative can flow from preservative inlet 109 and from the nozzles 108 by the lumen 107 into the mat 104. The plunger 112 may be locked in the fully retracted position by rotating the handle 115 into the proximal locking slot 129. In the fully retracted position, the plunger piston 114 would be just above the inlet 109.

Once sufficient volume of preservative has been injected, the plunger 112 is depressed to purge remaining preservative from the lumen 107 of the injection bayonet 106 form the nozzles 108. The plunger 112 may be locked in the fully inserted position by rotating the handle 115 into the distal locking slot 130.

Preferably, the plunger 112 is also subsequently fully retracted again to suck any further remaining preservative away from the nozzles 108. Once retracted, the handle 115 may be rotated into the yet further proximal locking slot to keep the plunger piston 114 in the blocking position shown in FIG. 3.

It should be noted that the configuration of the embodiment shown in FIG. 6 wherein the plunger piston 114 reciprocates within the lumen 107 of the injection bayonet 106 need not require the aforedescribed shut-off valve 111.

The foregoing description, for purposes of explanation, used specific nomenclature to provide a thorough understanding of the invention. However, it will be apparent to one skilled in the art that specific details are not required in order to practise the invention. Thus, the foregoing descriptions of specific embodiments of the invention are presented for purposes of illustration and description. They are not intended to be exhaustive or to limit the invention to the precise forms disclosed as obviously many modifications and variations are possible in view of the above teachings. The embodiments were chosen and described in order to best explain the principles of the invention and its practical applications, thereby enabling others skilled in the art to best utilize the invention and various embodiments with various modifications as are suited to the particular use contemplated. It is intended that the following claims and their equivalents define the scope of the invention.

The invention claimed is:

1. A system comprising
an embedded foundation;
a preservation wrap surrounding the embedded foundation; and
injection apparatus comprising:
an injection bayonet having a lumen fluidly interfacing a plurality of preservative outlet nozzles along the injection bayonet, the injection bayonet being configured to be inserted between the preservation wrap and the foundation;
a preservative inlet fluidly interfacing the lumen;
a syringe operating between the preservative inlet and the lumen, wherein, in use:
when replenishing the preservation wrap, the injection bayonet is configured to be inserted between the preservation wrap and the foundation so that preservative can be supplied via the preservative inlet to flow out from the nozzles via the lumen to replenish the preservation wrap with the preservative; and
after replenishment, the lumen is configured to be purged of residual preservative by the syringe.

2. The system as claimed in claim 1, wherein a plunger piston of the syringe does not reciprocate within the lumen and wherein the apparatus further comprises a shut-off valve operating between the syringe and the preservative inlet, so that, in use, after the replenishment, the lumen is configured to be purged by closing the shuttle valve and pressing a plunger of the syringe to purge excess preservative from the lumen of the injection bayonet.

3. The system as claimed in claim 1, wherein a plunger piston of the syringe reciprocates within the lumen so that, in use, when replenishing the preservation wrap, the plunger piston is configured to be positioned away from between the preservative inlet and the lumen so that preservative can flow from the preservative inlet into the lumen and after the replenishment, a plunger of the syringe is configured to be depressed to purge remaining preservative from the lumen via the nozzles.

4. The system as claimed in claim 3, wherein, after depressing the plunger, the plunger is configured to be retracted again to suck any remaining preservative within the lumen away from the nozzles.

5. The system as claimed in claim 1, wherein the shut-off valve is an automatic shut-off valve wherein positive pressure at the preservative inlet causes the shut-off valve to open.

6. The system as claimed in claim 1, wherein a piston plunger of the syringe is positionable at the preservative inlet to block fluid flow passage between the preservative inlet and the lumen.

7. The system as claimed in claim 1, wherein the syringe substantially aligns with a longitudinal axis of the bayonet.

8. The system as claimed in claim 1, wherein the nozzles are arranged only on an exterior surface of the injection bayonet.

9. The system as claimed in claim 8, wherein the exterior surface is convex in longitudinal cross-section.

10. The system as claimed in claim 1, wherein a rear surface of the injection bayonet is planar.

11. The system as claimed in claim 1, wherein the injection bayonet is able to be disconnected from the syringe.

12. The system as claimed in claim 11, wherein the injection bayonet comprises a syringe connection hub which connects with a distal end of the syringe.

13. The system as claimed in claim 1, wherein the injection bayonet is bendable.

14. The system as claimed in claim 1, wherein the injection bayonet is plastic.

15. The system as claimed in claim 1, wherein the apparatus comprises:
   a profiled backing plate;
   a semicylindrical tube portion attached to the backing plate and wherein the semicylindrical tube portion and the backing plate define the lumen therebetween.

16. The system as claimed in claim 15, wherein a plunger piston of the syringe reciprocates within the lumen.

17. The system as claimed in claim 15, wherein the profiled backing plate forms a proximal syringe backing portion and wherein the proximal syringe backing portion defined a series of tabs configured to provide purchase to insert or remove the apparatus.

18. The system as claimed in claim 15, wherein the semicylindrical tube portion defines a longitudinal channel for a handle of a plunger of the syringe.

19. The system as claimed in claim 18, wherein the semicylindrical tube portion further defines a proximal locking slot from the longitudinal channel for the handle to retain the plunger in a retracted position.

20. The system as claimed in claim 18, wherein the semicylindrical tube portion further defines a distal locking slot from the longitudinal channel for the handle to retain the plunger in a depressed position.

21. The system as claimed in claim 18, wherein the semicylindrical tube portion further defines a locking slot from the longitudinal channel for the handle to position the piston plunger at the preservative inlet to block fluid flow passage between the preservative inlet and the lumen.

22. A method of replenishing a preservation wrap using the system as claimed in claim 1, the method comprising:
   inserting the injection bayonet between the preservation wrap and the foundation and supplying preservative via the preservative inlet to flow out from the nozzles via the lumen to replenish the preservation wrap with the preservative; and
   after replenishment, purging the lumen using the syringe.

23. The method as claimed in claim 22, further using the system as claimed in claim 2 wherein a plunger piston of the syringe does not reciprocate within the lumen wherein the method further comprises:
   after the replenishment, purging the lumen by depressing a plunger of the syringe to purge excess preservative from the lumen of the injection bayonet.

24. The method as claimed in claim 22, further using the system as claimed in claim 3, wherein a plunger piston of the syringe reciprocates within the lumen, wherein the method further comprises:
   when replenishing the preservation wrap, positioning the plunger piston away from between the preservative inlet and the lumen so that preservative can flow from the preservative inlet into the lumen; and
   after the replenishment, depressing a plunger of the syringe to purge remaining preservative within the lumen via the nozzles.

25. The method as claimed in claim 24, wherein, after depressing the plunger, the plunger is again retracted to suck any remaining preservative within the lumen away from the nozzles.

* * * * *